Sept. 20, 1949.  J. L. BREESE ET AL  2,482,649
BURNER WITH INTEGRAL WATER HEATING DEVICE Filed Dec. 8, 1945  2 Sheets-Sheet 1

Inventors
James L. Breese
Bruce Hayter by Parker Carter
Attorneys

Sept. 20, 1949.    J. L. BREESE ET AL    2,482,649
BURNER WITH INTEGRAL WATER HEATING DEVICE
Filed Dec. 8, 1945    2 Sheets-Sheet 2
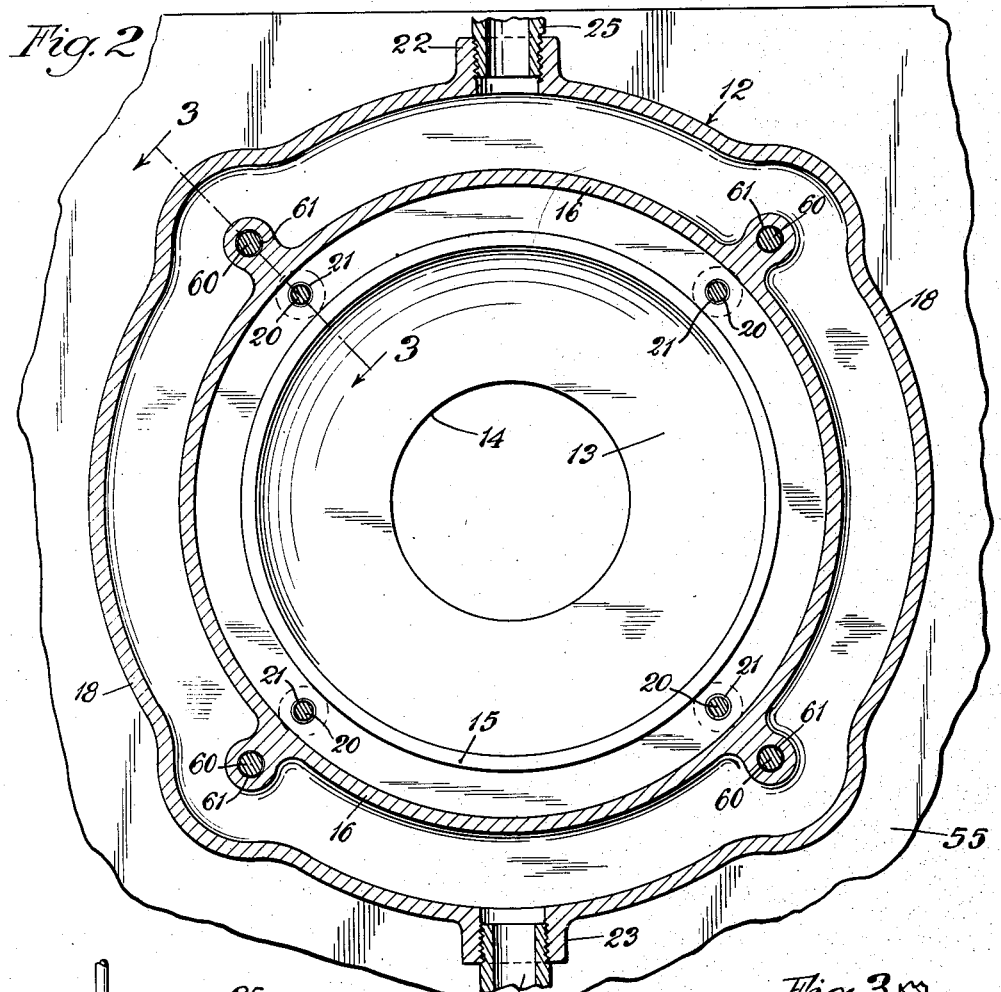
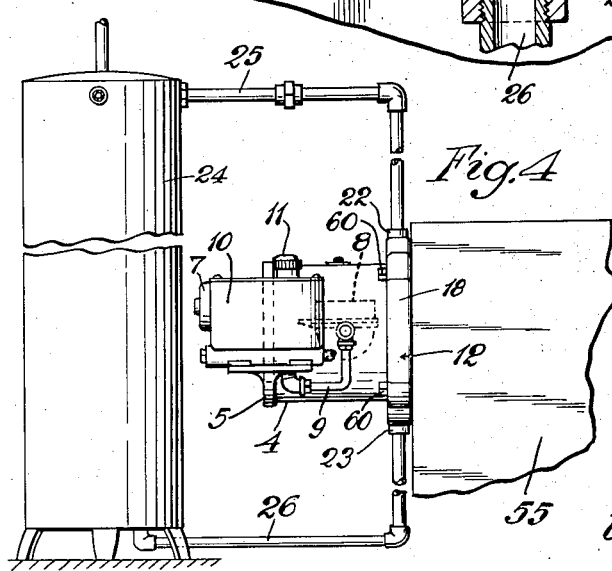
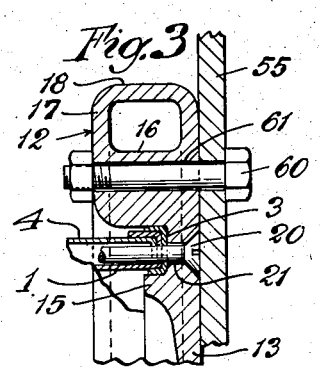
Inventors
James L. Breese
Bruce Hayter
by Parker & Carter
Attorneys Patented Sept. 20, 1949

2,482,649

UNITED STATES PATENT OFFICE 2,482,649

BURNER WITH INTEGRAL WATER-HEATING DEVICE

James L. Breese and Bruce Hayter, Santa Fe, N. Mex., assignors, by mesne assignments, to Breese Burners, Inc., Santa Fe, N. Mex., a corporation of Delaware Application December 8, 1945, Serial No. 633,788

3 Claims. (Cl. 126—350)

Our invention relates to an improvement in burners and has for one purpose to provide means for heating water or other liquids or fluids.

Another purpose is to provide an improved water heating member or assembly which can be secured directly to the burner and which is heated by the heat of combustion of the burner.

Another purpose is to provide an improved hot water heating member or assembly for use with hydroxylating pot type burners.

Another purpose is to provide a burner assembly, including a pot type burner and a heating member which is adapted at the same time to heat water and to serve as a flame ring for the pot.

Another purpose is to provide an improved flame ring which may be applied to a pot and which includes a water heating component.

Another purpose is to provide a heat exchanger which can be applied as an integral part of a burner, such as a pot type burner, and which picks up and employs what would otherwise be waste heat.

Other purposes will appear from time to time in the course of the specification and claims.

I illustrate my invention more or less diagrammatically in the accompanying drawings wherein:

Figure 2 is a section on the line 2—2 of Figure 1;

Figure 3 is a section on the line 3—3 of Figure 2; and

Figure 4 is a diagrammatic side elevation on a reduced scale illustrating the device in connection with a hot water system.

Like parts are indicated by like symbols throughout the specification and drawings.

Figure 1:
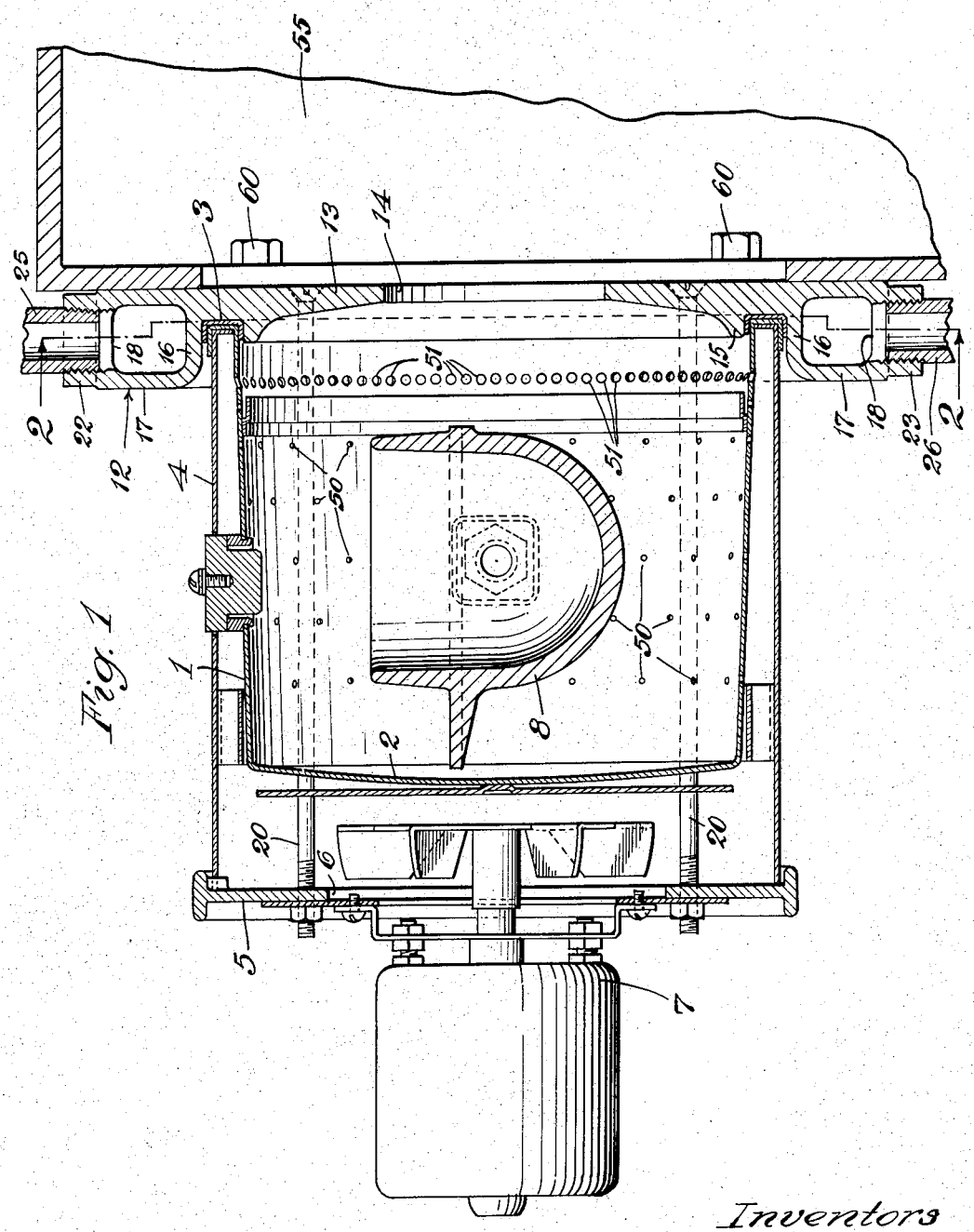
Figure 1 is a section taken on the axis of the burner pot.

Referring to the drawings, 1 generally indicates the side wall of a burner pot and 2 the closed end wall of such a pot. The pot is herein illustrated as a so-called horizontal pot in which the axis of the pot is horizontal. It will be understood that this is a matter of illustration, and that our invention may be applied to burners wherein the axis is other than horizontal such as burner pots having a vertical axis. The burner pot is shown as having a top or end flange 3, adjacent the open end of the burner. 4 indicates a generally cylindrical outer housing having an end 5 centrally apertured as at 6 to receive any suitable booster fan assembly 7, the details of which do not form part of the present invention. 8 is a vaporizing cup, located within the burner and supplied with any suitable liquid fuel through any suitable duct 9 extending to any suitable source of liquid fuel not herein shown. The rate of flow of liquid fuel along the duct 9 may be controlled by any suitable valve means herein shown as 10. It will be understood that we may employ a conventional float valve or any other means for controlling the rate of liquid fuel flow. As a matter of illustration, however, we illustrate a valve including a manual valve controlling member 11. If a vertical axised pot is used, the fuel may be supplied to the bottom of the pot.

12 generally indicates a water heating assembly and combined flame ring. It is shown as including a front plate 13 which may be centrally apertured as at 14 and has an inner flange 15 and is outwardly continued by means of an inner side wall 16, a wall 17, and an outer side wall 18, to form a circumferentially extending duct. The space between the flange 15 and the wall 16 is adapted to receive the end portions of the pot 1 and the outer cylindrical housing 4, the parts being secured by any suitable screws 20 extending through apertures 21 in the plate 13. 22 and 23 are duct extensions, either of which may serve as an inlet duct or an outlet duct, depending upon the desired direction of flow of the water or other fluid being heated. The assembly may be secured in connection with any suitable water storage tank diagrammatically indicated at 24, to which the duct may be secured in circuit by any suitable pipes 25 and 26.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of the invention are as follows:

In hydroxylating pot type burners which we have developed in the past, we employ a pot, such as the pot 1, having a circumferential side wall provided with a plurality of primary air inlets 50 circumferentially spaced thereabout and located at various distances from the ends of the pot. The liquid fuel supplied to the vaporizing cup 8 receives its primary supply of air through the apertures 50, and the combination of primary air and vaporized fuel moves toward the open end of the pot. There it may receive a secondary supply of air from the secondary air inlets 51. We may employ a variety of such inlets, but for convenience we illustrate a single row of inlets, somewhat larger than the primary air inlets 50, somewhat more closely spaced and having axes inclined toward the central aperture 14 of the flame ring component 13 of the heating assembly. When a maximum supply of liquid fuel is delivered for vaporization to the cup 8, and when the booster motor 7 is operating, there is a substantial flow of flame against the inner face of the ring 13 and through the aperture 14. This flame extends into any suitable combustion chamber 55, the details of which do not form part of the present invention. We employ this flame, without perceptible loss of heating effect, to heat water circulating through the duct defined by the walls 13, 16, 17, and 18. The flame ring component 13 is shown as integral with the water-carrying duct. This is advantageous, but is not an absolutely necessary arrangement. A separate ring portion in adequate heat transfer relation with the duct may be employed. By employing a well insulated storage tank 24 in circuit with the duct, cold water from the bottom of the tank may circulate to the duct for heating and water heated by the duct is returned to the top of the tank. Thus, in the normal operation of the burner a tank of substantial size may be kept adequately heated.

The burner unit may be secured to the combustion chamber element 55 by bolts 60 which extend through apertures 61 in the combined flame ring and water heating structure 12.

Whereas we have shown our invention as applied to a hydroxylating pot type burner in which a liquid fuel is vaporized in a burner pot, it will be understood that our invention may be applied to other burners and may be used with other fuels such as gas.

We claim:

1. In combination a pot type burner having an open mouth, a flame ring partially closing the mouth thereof, a water chamber in the outer periphery of the ring encircling and entirely outside of the mouth of the burner, conduits connected to the chamber adapted to permit water circulation therethrough.

2. In combination a pot type burner having an open mouth, a flame ring partially closing the mouth thereof, a water chamber in the outer periphery of the ring encircling and entirely outside of the mouth of the burner, conduits connected to the chamber adapted to permit water circulation therethrough, the burner having a periphery of secondary air inlet apertures in the wall thereof adjacent the open mouth, that position of the flame ring which contains the water chamber being bounded on the side furthest from the plane of the open mouth by the plane passing through and defined by the inlet apertures.

3. In combination a pot type burner having an open mouth, a housing supporting the burner and containing a combustion chamber in register with the burner, a flame ring partially closing the mouth of the burner and interposed between it and the combustion chamber, a water chamber in the outer periphery of the ring encircling and entirely outside of the mouth of the burner and entirely outside of the combustion chamber whereby water in the chamber is heated entirely by heat conducted from the inner position of the flame ring across the pot mouth to the water chamber.

JAMES L. BREESE.
BRUCE HAYTER.

REFERENCES CITED

The following references are of record in the file of this patent:

UNITED STATES PATENTS

| Number | Name | Date |
|---|---|---|
| 1,341,642 | Hoffman | June 1, 1920 |
| 1,852,261 | Piatt | Apr. 5, 1932 |
| 2,119,007 | Dalen | May 31, 1938 |
| 2,136,317 | Rialdini | Nov. 8, 1938 |
| 2,170,279 | Robinson | Aug. 22, 1939 |
| 2,364,791 | Home | Dec. 12, 1944 |
| 2,384,721 | Breese et al. | May 16, 1944 |